United States Patent [19]

Sedlack

[11] Patent Number: 5,607,203
[45] Date of Patent: Mar. 4, 1997

[54] CHILD'S CAR SEAT WITH IMPROVED OVERHEAD SHIELD

[75] Inventor: Mark A. Sedlack, Cuyahoga Falls, Ohio

[73] Assignee: Century Products Company, Macedonia, Ohio

[21] Appl. No.: 556,680

[22] Filed: Nov. 10, 1995

[51] Int. Cl.$^6$ ............................................... A47D 1/10
[52] U.S. Cl. .................... 297/256.15; 403/109; 403/322; 297/487; 297/488
[58] Field of Search ............................ 297/256.15, 250.1, 297/487, 488, 184.13, 463.1; 403/109, 322

[56] References Cited

U.S. PATENT DOCUMENTS

| | | | |
|---|---|---|---|
| 2,668,583 | 2/1954 | Singer | 297/488 |
| 3,999,733 | 12/1976 | Harder, Jr. et al. | 297/345 X |
| 4,399,572 | 8/1983 | Johansson | 297/312 X |
| 4,456,298 | 6/1984 | Gottstein | 403/322 X |
| 4,456,302 | 6/1984 | Knoedler et al. | 297/488 |
| 4,738,489 | 4/1988 | Wise et al. | 297/256.15 X |
| 4,909,574 | 3/1990 | Sedlack | 297/488 |
| 5,427,432 | 6/1995 | Meeker et al. | 297/488 X |
| 5,433,551 | 7/1995 | Gordon | 403/109 X |

Primary Examiner—Peter M. Cuomo
Assistant Examiner—Stephen Vu
Attorney, Agent, or Firm—Graham & James LLP

[57] ABSTRACT

An overhead shield for a child's car seat has a pair of arms pivotally attached to the side walls of the car seat and a central section which is adjustable with respect to the pivotable arm portions. A stationary rack secured to the arm has a plurality of rack notches which engage a pawl latch pivotally mounted to the side extensions of a central cushion member. An exposed operating button enables the pawl latch to be disengaged from the rack notches, and a bias spring normally urges the latch pawl into engagement with one of the rack notches.

6 Claims, 3 Drawing Sheets

CHILD'S CAR SEAT WITH IMPROVED OVERHEAD SHIELD

BACKGROUND OF THE INVENTION

This invention relates to infants' and children's car seats having overhead shields. More particularly, this invention relates to such a car seat provided with an overhead shield with arms of adjustable length.

Infants' and children's car seats are known which are provided with a safety shield which is pivotally attached at an appropriate point to the sides of the seat. Such shields are typically U-shaped with a padded central section to cushion the occupant in the event of a collision, and the shield is pivotally attached so as to be maneuverable to an overhead position in which the infant or child can be easily placed in and removed from the car seat.

Most such overhead shields have arms of fixed length, which suffer from the disadvantage that as the infant grows in size insufficient space is afforded by the inner periphery of the shield to comfortably accommodate the child. At this point, the shield loses its utility. One solution to this problem is to provide car seats with overhead shields having arms of different length. However, this solution is quite costly in that it requires replacement of the entire seat structure at least once. A compromise solution is to design the shield with an intermediate length: however, this solution suffers from the disadvantage that the arms can be too long for an infant and too short for a child of forty pounds or more.

Attempts in the past have been made to provide overhead shields with arms of adjustable length: however, to date such shields have provided only nominal adjustment ranges, on the order of a maximum of approximately two and a half inches.

SUMMARY OF THE INVENTION

The invention comprises a comprises an adjustable arm structure for an infant and child's car seat which provides a broader range of adjustability and therefore is capable of accommodating a broader range of children ranging from a newborn infant to a child of about forty pounds in weight (a typical four-year old child).

From an apparatus standpoint, the invention comprises an adjustable overhead shield for a child's car seat, the shield comprising first and second arm members each having an attachment end and a distal end and a rack member secured thereto and having a plurality of notches arranged thereal-ong. A central U-shaped member is provided with first and second side sections each slidably engagable with the first and second arm members, respectively, at the distal end thereof. Each of the side sections includes a pawl latch pivotally mounted therein, the pawl latch having a nose portion engagable in locking relation with the notches and an operating end having a manually engagable surface.

Each of the side sections also includes a bias member, preferably a folded blade spring, for urging the nose portion of the pawl latch into engagement with one of the notches.

The invention includes a position indicator mounted on at least one of the arm members to indicate the relative position of the central U-shaped member and the first and second arm members. Each of the side sections also includes an abutment stop for limiting outward movement of the side sections relative to the arm members.

For a fuller understanding of the nature and advantages of the invention, reference should be made to the ensuing detailed description, taken in conjunction with the accompanying drawings.

DETAILED DESCRIPTION OF THE PREFERRED EMBODIMENTS

Figure 1:
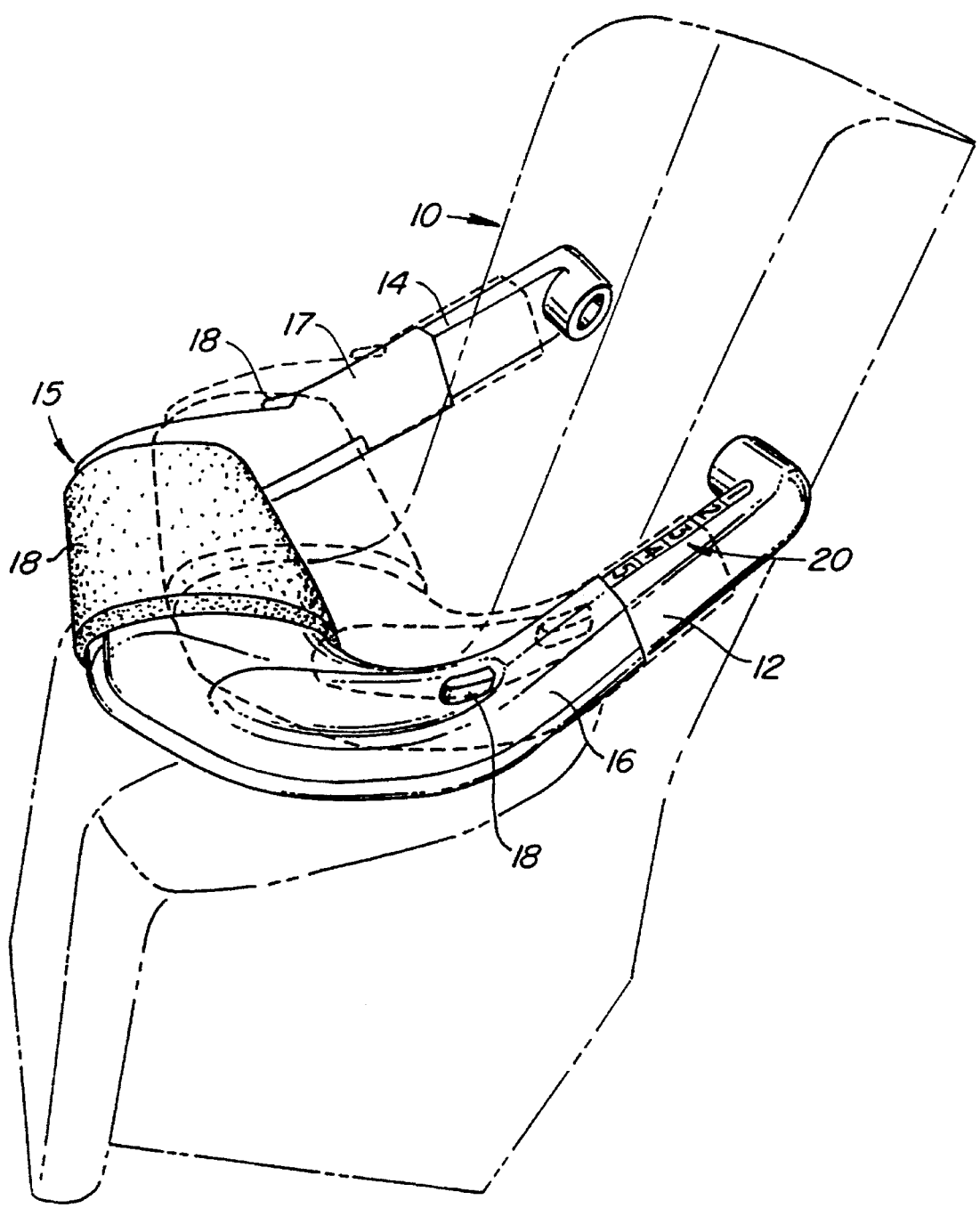
FIG. 1 is a perspective view of an adjustable overhead shield incorporating the invention.

Turning now to the drawings, FIG. 1 is a perspective view of a preferred embodiment of the invention showing a car seat 10 in phantom. As seen in this figure, the overhead shield comprises a generally U-shaped device having a pair of arms 12, 14, and a U-shaped central member generally designated with reference numeral 15. Arms 12, 14 are pivotally attached to the outer side walls of car seat 10 in any suitable fashion so as to be maneuverable from the position shown in full to an overhead position in which an infant or child can be placed in the car seat 10 or removed therefrom without interference from the shield.

Central member 15 includes a pair of cover portions 16, 17 which are slidably arranged on arms 12, 14, and a padded center portion 18 which provides a cushion against sudden impacts. Each arm 12, 14 is provided with a locking mechanism described below and including a release button 18 for enabling the relative position of central member 15 to be adjusted relative to arms 12, 14. An indicator scale 20 is provided on at least one of the arms 12, 14 to indicate the relative position of the central member 15.

Figure 2:
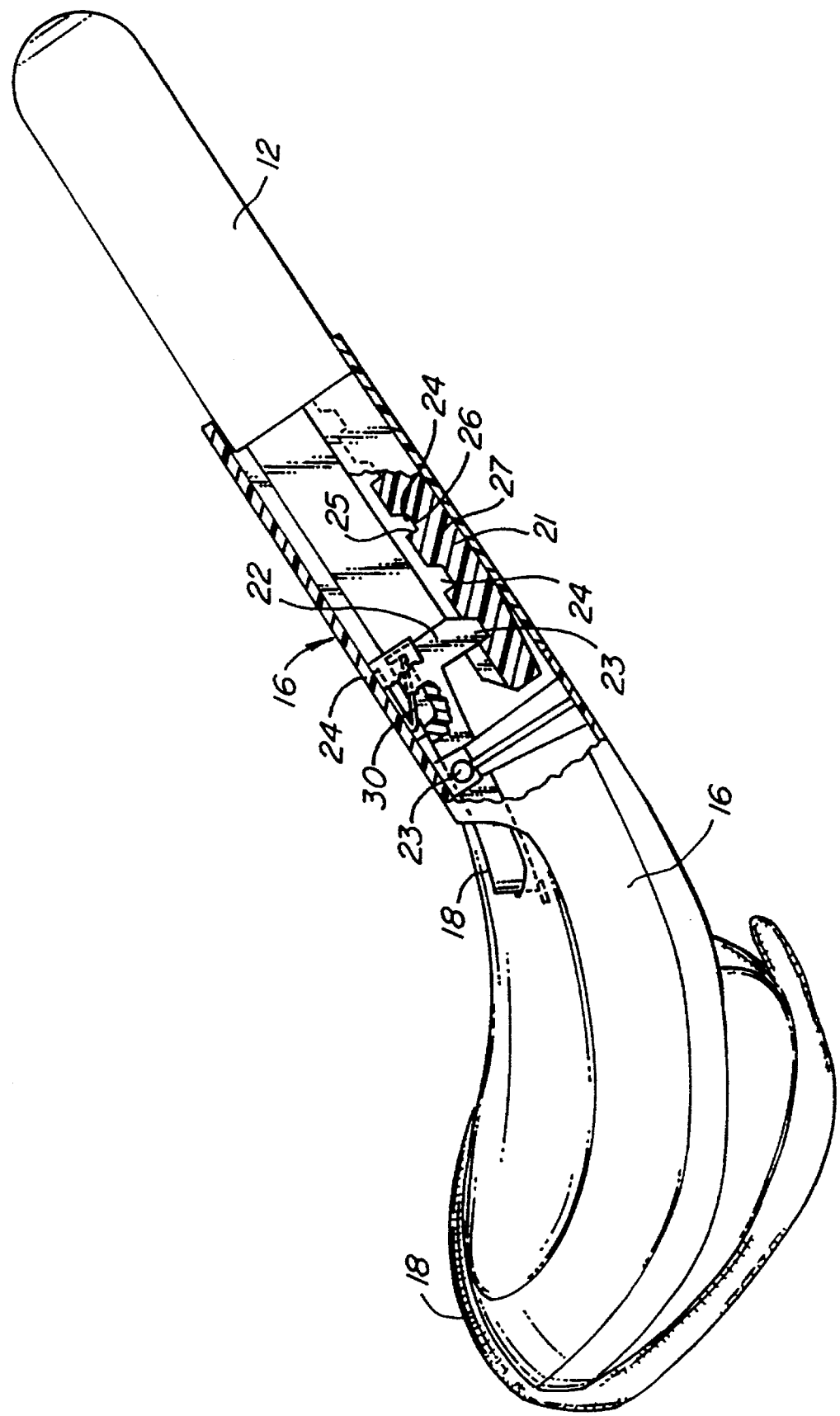
FIG. 2 is a side view of the left arm partially in section illustrating the adjustment mechanism in the locked position.
Figure 3:
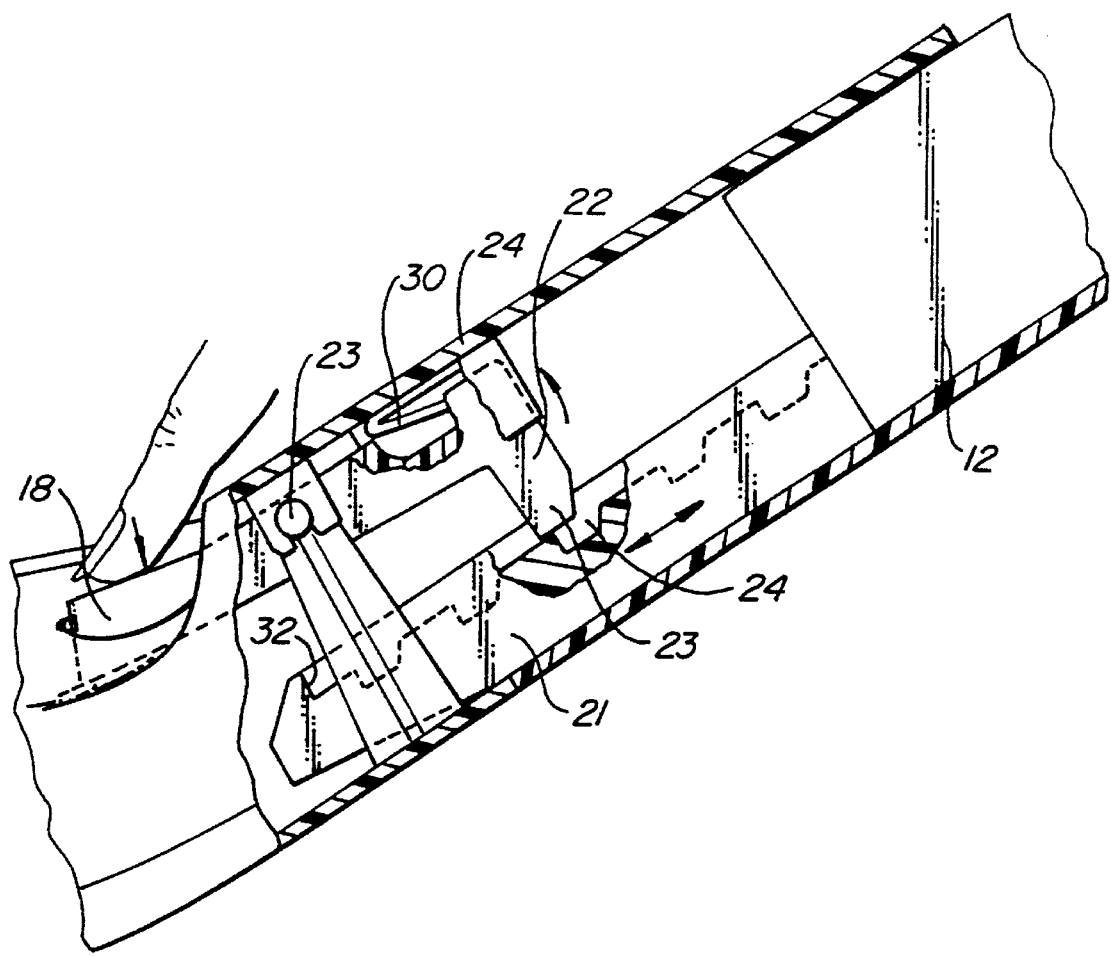
FIG. 3 an enlarged detail view partially in section illustrating operation of the release mechanism.

With reference to FIGS. 2 and 3, which illustrate the locking mechanism for the left arm 12 (which is identical to the locking mechanism for the right arm 14), a notched rack 21 is secured to arm 12 in any suitable fashion, such as by using appropriate fasteners, bonding or the like. Rack 20 is stationary with respect to arm 12. A pawl latch 22 is pivotally secured at pin 23 to a substantial upper portion 24 of member 16. Pawl latch 22 is generally L-shaped and has a nose portion 23 with a shape conformable with the notches 24 formed in rack 20. In the preferred embodiment, notches 24 have a straight front edge 25 arranged substantially normal to the bottom 26, and a sloping ramp rear edge 27.

Pawl latch 22 terminates at the free end in button 18 having a surface shaped to accommodate a finger or thumb. A blade spring 30 is arranged between the inner surface of upper portion 24 and the rear edge of the nose portion 23 of pawl latch 22. Thus, when the button 18 is not operated, spring 30 maintains nose portion 23 engaged in one of the rack notches 24.

With reference to FIG. 3, when button 18 is pushed downwardly using a finger or thumb, pawl latch 22 rotates counter-clockwise about pivot 23 against the force of spring 30 to lift nose portion 23 clear of the rack slot 24. Once the pawl latch 22 is disengaged from the rack 20, center member 15 can be adjusted inwardly or outwardly of arm 12 to the desired position. After the adjustment has been made, button 18 is released, and spring 30 forces the pawl latch 22 against the rack 21. If the nose portion 23 is in registration with one of the rack notches 24, spring 30 will automatically cause engagement between nose portion 23 and a rack notch 24. If nose portion 23 is not in exact registration with one of the rack notches 24, further manipulation of central member 15 will eventually result in proper registration and automatic engagement under the force of spring 30.

In order to prevent complete removal of central member 15 from arms 12, 14, an abutment stop 32 is provided at the forward end of rack 21.

As will now be apparent, the invention provides easy adjustability of the length of the overhead shield by simply depressing buttons 18 and maneuvering central member 15 on side arms 12, 14. The range of adjustability depends on the length of rack 20 and the number of notches provided. In one embodiment, the range of adjustability is 3.0 inches: however, greater lengths may be provided, as desired.

While the above provides a full and complete disclosure of the preferred embodiments of the invention, various modifications, alternate constructions and equivalents may be employed, as desired. Therefore, the above description and illustrations should not be construed as limiting the scope of the invention, which is defined by the appended claims.

What is claimed is:

1. An adjustable overhead shield for a child's car seat, said shield comprising:

first and second arm members each having an attachment end and a distal end and a rack member secured thereto and having a plurality of notches arranged therealong; and a central U-shaped member having first and second side sections each slidably engagable with said first and second arm members, respectively, at the distal end thereof, each of said side sections having a pawl latch pivotally mounted therein, said pawl latch having a nose portion engagable in locking relation with said notches and an operating end having a manually engagable surface, and a bias member for urging said nose portion of said pawl latch into engagement with said notch.

2. The invention of claim 1 wherein said bias member comprises a folded blade spring.

3. The invention of claim 1 further including a position indicator mounted on at least one of said arm members.

4. The invention of claim 1 wherein said manually engagable surface is shaped to accommodate an end of a finger.

5. The invention of claim 1 further including an abutment stop for limiting outward movement of said side sections relative to said arm members.

6. The invention of claim 1 wherein said central U-shaped member includes a cushion portion arranged centrally thereof.

* * * * *